United States Patent [19]

Rice

[11] 4,323,836
[45] Apr. 6, 1982

[54] POWER SERVICE MOUNTING SYSTEM

[76] Inventor: Lawrence F. Rice, 120 Francis Wyman Rd., Burlington, Mass. 01803

[21] Appl. No.: 153,339

[22] Filed: May 27, 1980

[51] Int. Cl.³ .................... H01M 10/46; H05K 5/04; H02B 1/04
[52] U.S. Cl. ........................................ 320/2; 174/48; 174/52 R; 307/10 R
[58] Field of Search ................... 174/48, 49, 52 R, 58, 174/50; 320/2; 307/10 R

[56] References Cited

U.S. PATENT DOCUMENTS

| | | | |
|---|---|---|---|
| 3,461,349 | 8/1969 | Meyer | 174/50 |
| 3,699,235 | 10/1972 | Wasson et al. | 174/48 |
| 3,752,900 | 8/1973 | Harrison et al. | 174/50 X |
| 4,015,397 | 4/1977 | Flachbarth et al. | 174/48 X |
| 4,034,271 | 7/1977 | Palazzetti et al. | 307/10 R |
| 4,096,428 | 1/1978 | Hanson et al. | 320/2 |
| 4,246,436 | 1/1981 | Hoffman et al. | 174/50 X |

*Primary Examiner*—Robert J. Hickey
*Attorney, Agent, or Firm*—Joseph S. Iandiorio

[57] ABSTRACT

A power service mounting system including a plurality of wall mounting brackets, each having upper and lower spaced gripping means; a power service housing having first upper and lower engagement portions on one side for engagement with the gripping means to hold the housing on the wall, and second upper and lower engaging portions on the opposite side, the housing including first electrical connection means for connection with an external power source, second electrical connection means for distributing power, and intermediate circuit means interconnecting first and second electrical connection means; and at least one equipment mounting bracket having upper and lower spaced gripping means for engagement with the second upper and lower engaging portions of the housing, one of the upper and lower spaced gripping means of the equipment mounting bracket including clamping means for urging the housing against the other of the upper and lower gripping means, and equipment mounting means on the equipment mounting bracket for supporting equipment to be serviced by the system.

8 Claims, 8 Drawing Figures

POWER SERVICE MOUNTING SYSTEM

FIELD OF INVENTION

This invention relates to a power service mounting system for providing power to operate, and means for mounting electrical equipment.

BACKGROUND OF INVENTION

In ambulances and other emergency vehicles which carry electrical medical equipment, it is necessary to periodically charge the batteries of the equipment. This is usually done when the vehicle is parked using an extension cord to plug into a wall receptacle proximate the parked vehicle, and a separate battery charger where the equipment has none. This requires either that one extension cord be provided for each piece of equipment or that they be recharged one at a time. Typically the equipment is mounted by screws or bolts to the wall of the vehicle, and removal for replacement or repair is time consuming.

SUMMARY OF INVENTION

It is therefore an object of this invention to provide an improved, simple, inexpensive, compact power service mounting system which provides power to electrical equipment and securely mounts that equipment to the wall of a vehicle or building.

It is a further object of this invention to provide such a system which is easily dismounted from and remounted to a wall and which allows easy dismounting and remounting of the equipment with the system.

The invention features a power service mounting system including a plurality of wall mounting brackets each having upper and lower spaced gripping means. A power service housing has first upper and lower engaging portions on one side for engagement with the gripping means to hold the housing on a wall. There are second upper and lower engaging portions on the opposite side of the housing. The housing includes first electrical connection means for connection with an external source, and second electrical connection means for distributing power. Intermediate circuit means interconnects the first and second electrical connection means. There is at least one equipment mounting bracket having upper and lower spaced gripping means for engagement with the second upper and lower engaging portions of the housing. One of the upper and lower spaced gripping means of the equipment mounting bracket includes clamping means for urging the housing against the other of the upper and lower gripping means. Equipment mounting means carried by the clamping means supports the equipment to be serviced by the system.

In one embodiment the upper and lower gripping means of the wall mounting brackets includes salient portions extending inwardly toward the housing, and the first upper and lower engaging portions include grooves along the housing. At least one of the upper and lower gripping means of the equipment mounting bracket includes a salient portion extending toward the housing, and the clamping means includes cam means. The second upper and lower engaging portions also may include grooves along the housing. The housing may include a base with a rail along each edge, and a cover having an internal channel along each lower edge to engage with the rail. The housing may include an end plate at each end and each electrical connection means may be mounted in one of those end plates. The intermediate circuit may include one or more of the following: transformer means, battery charging means, auxiliary battery means, a converter connected to the vehicle battery.

DISCLOSURE OF PREFERRED EMBODIMENT

Other objects, features and advantages will occur from the following description of a preferred embodiment and the accompanying drawings, in which.

Figure 1:
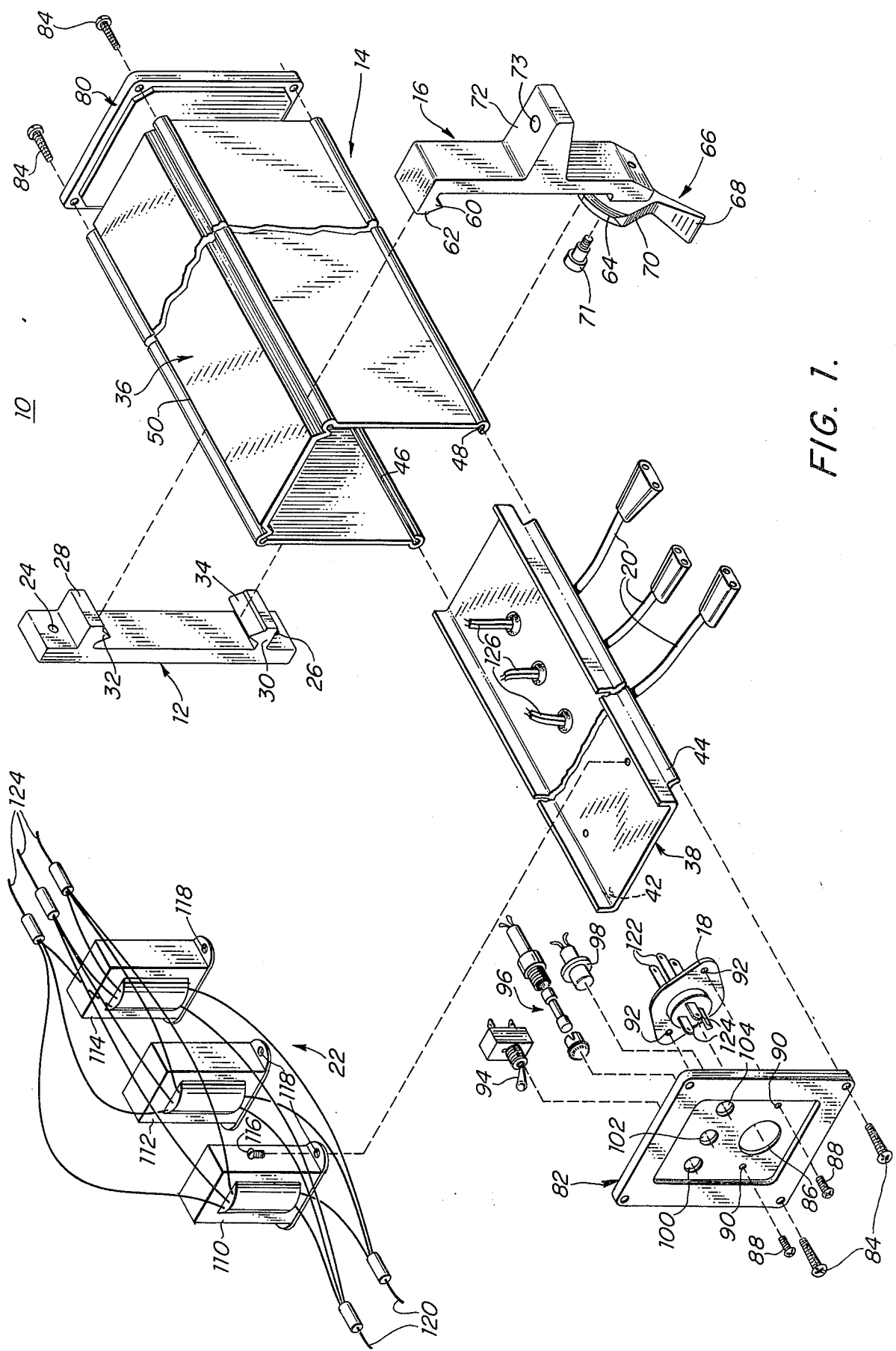
FIG. 1 is an exploded axonometric view of a power service mounting system according to this invention.
Figure 2:
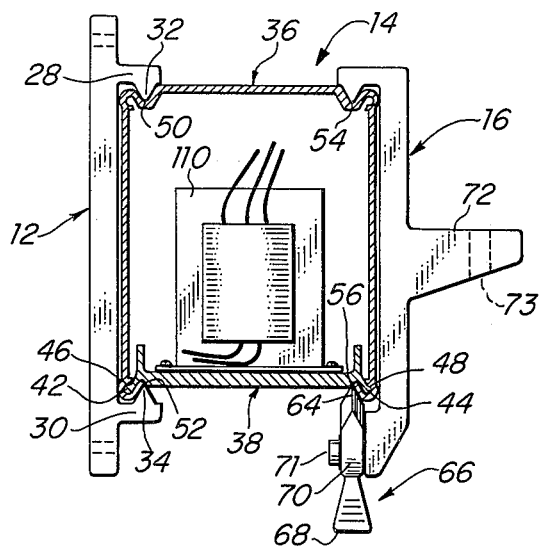
FIG. 2 is an end view of the system of FIG. 1 with the housing shown in cross section.

There is shown in FIG. 1 and FIG. 2 a power service mounting system 10 according to this invention which includes a wallmounting bracket 12, housing 14, equipment mounting bracket 16, first electrical connection means, male outlet 18, for introducing power to the system; and second electrical connection means, pigtail connectors 20, for distributing power output. An intermediate circuit 22 interconnects inlet 18 with outlets 20. Bracket 12 includes a pair of mounting holes 24, 26, for receiving screws to mount bracket 12 to a wall of a vehicle or building. Bracket 12 also includes gripping means 28 and 30, which have salient portions 32 and 34. Housing 14 includes cover 46 and base 38. Rails 42, 44 of base 38 engage with internal channels 46 and 48 at the lower ends of cover 36, as shown more clearly in FIG. 2. Grooves 50, 52 on one side of housing 36 engage with salient portions 32, 34 of gripping means 28 and 30 of bracket 12. A second set of grooves 54, 56 is provided on the other side of housing 36. Groove 54 engages with salient portion 60 of gripping means 62 on bracket 16, while lower groove 56 is engaged by the salient edge 64 of clamping means 66, which includes handle 68 and cam portion 70 mounted by shoulder screw 71 to bracket 16. Equipment mounting bracket 16 also includes a member 72 with hole 73 for mounting equipment. Brackets 12 and 16 may be made of metal or plastic.

Base 38 and cover 36 of housing 14 may be made of extruded plastic, and include end plates 80 and 82 held in place by means of screws 84. Base 38 is also removable to allow easy access to the electrical distribution system for both service and assembly. The first electrical connection means, male outlet 18, is mounted in hole 86 of end plate 82 by means of screws or other fasteners 88 that pass through holes 90 and 92 and engage with nuts therebeyond. A main switch 94, fuse assembly 96, and pilot light 98 may be mounted in holes 100, 102, and 104 in end plate 82 in the usual fashion. Intermediate circuit means 22 may include one or more transformers 110, 112, 114, mounted by means of screws 116 through holes 118 to base plate 38. Input leads 120 are connected to lugs 122 on outlet 18 while output leads 124 interconnect with pigtail ends 126 of pigtain connectors 20. Prongs 124 of outlet 18 receive the female end of a power extension cable.

Figure 3:
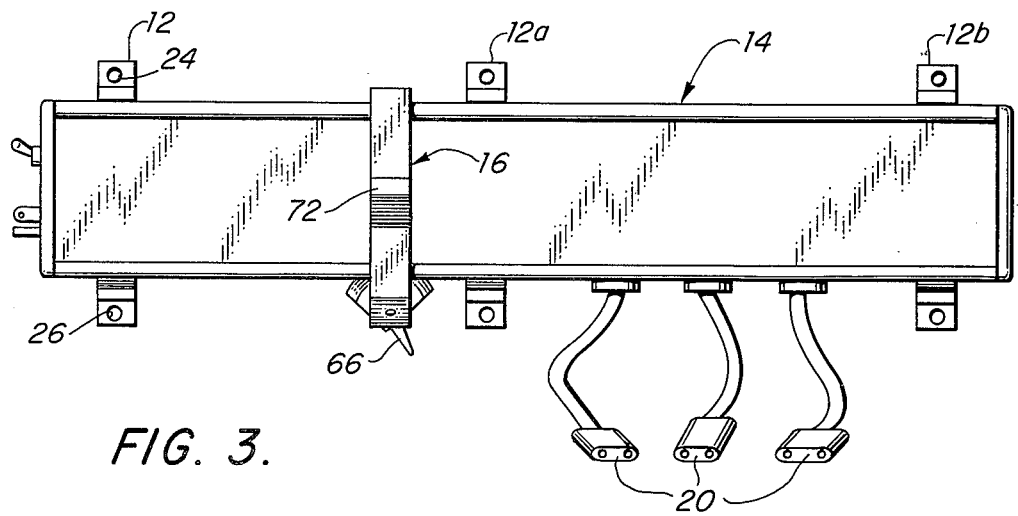
FIG. 3 is a side elevational view of the system of FIG. 1.

Typically, as shown in FIG. 3, housing 14 is held in position by a number of wall mounting brackets 12, 12a, and 12b, into which housing 14 may be slid with grooves 50, 52, engaging salient portions 32, 34 of brackets 12, 12a and 12b.

Figure 4:
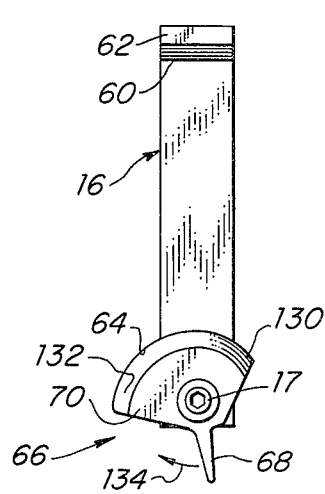
FIG. 4 is a front elevational view of an equipment mounting bracket according to this invention.
Figure 5:
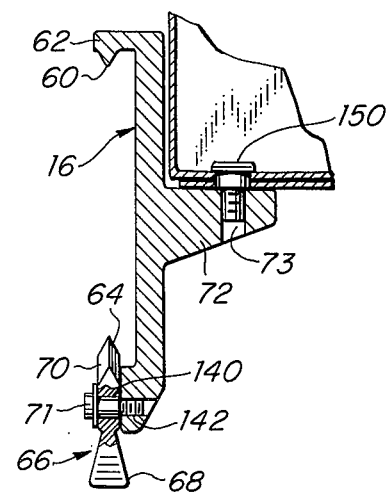
FIG. 5 is a side elevational cross-sectional view of the equipment mounting bracket of FIG. 4 showing a portion of a piece of equipment mounted to it.

Salient portion 64, FIG. 4, is a part of camming portion 70 of clamp 66. End 130 is of shorter radius than end 132, so that as handle 68 is moved in the direction of arrow 134, greater and greater force is applied by cam portion 70 through salient portion 64 bearing on the bottom 14 in groove 56. Clamp 66 is mounted by means of threaded shoulder bolt 71 passing through hole 140 in cam 70 to engage with threaded bore 142 in bracket 16. Mounting hole 73 of equipment mounting bracket 16 is also threaded to receive bolt 150, which mounts a piece of electrical equipment or a tray for holding a piece of electrical equipment and is to be supported by and provided power by the power service mounting system of this invention.

Figure 6:
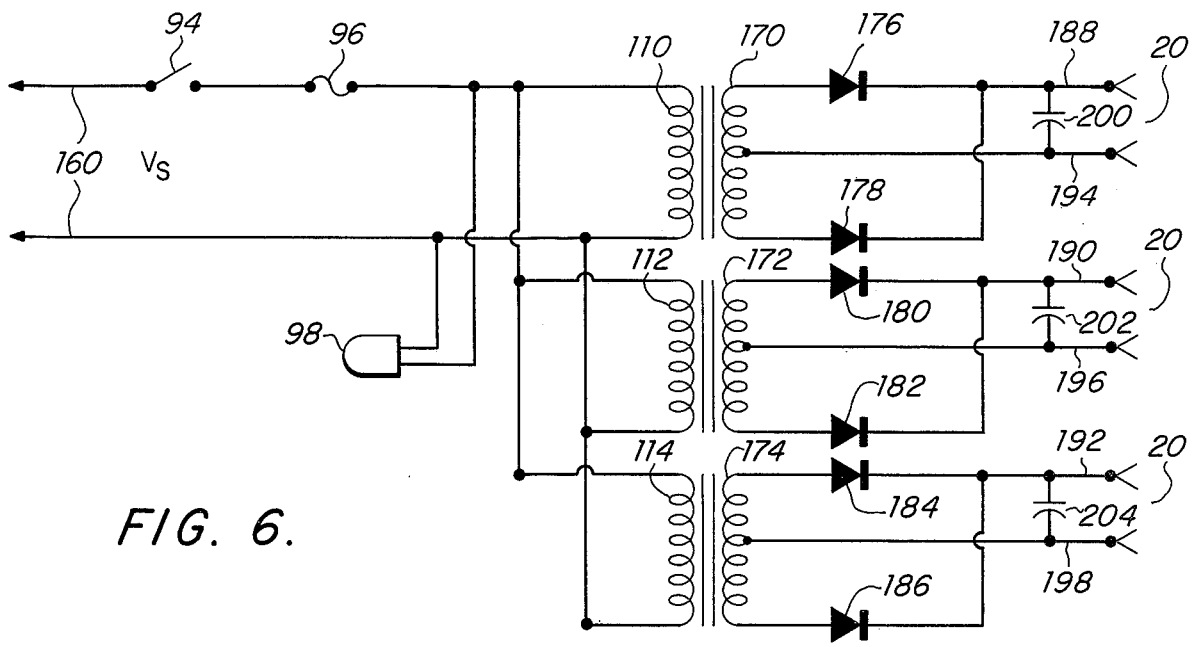
FIG. 6 is a schematic diagram of the electrical circuit of the system of FIG. 1.

The electrical circuit constituted by pigtail connectors 20, outlet 18, switch 94, fuse assembly 96, pilot 98, and intermediate circuit means 22, is shown in FIG. 6 Input power provided at prongs 124 passes from plugs 122 to lines 160, one of which is in series with switch 94 and fuse 96. Pilot light 98 is connected across line 160. The output from each of the secondary windings 170, 172, and 174 are rectified by diodes 176, 178, 180, 182, 184, and 186, to provide an output to each of lines 188, 190, and 192, respectively. The other output lines 194, 196, and 198, in each case are connected to the center tap of their respective transformers. A filter capacitor 200, 202, 204, is applied across each output.

Figure 7:
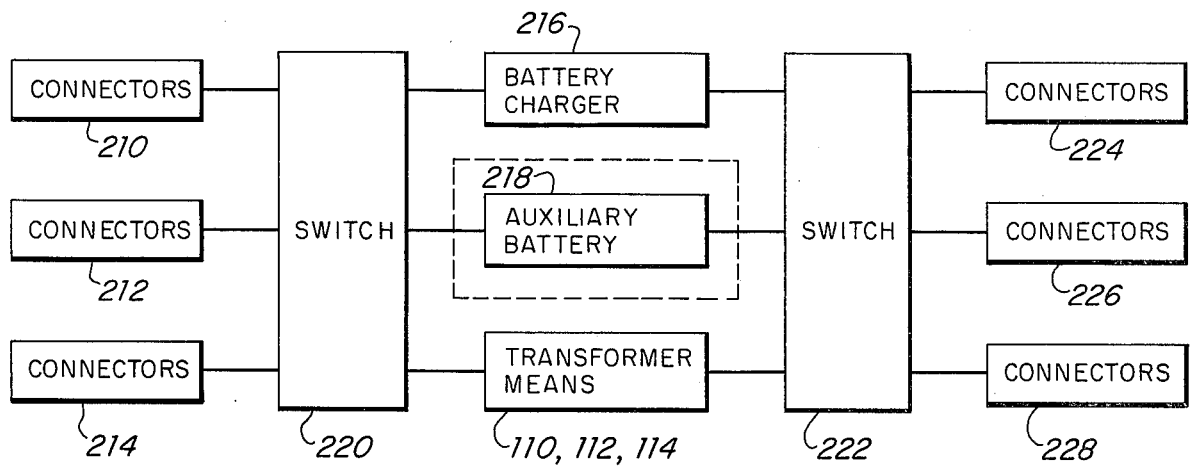
FIG. 7 is a block diagram of an alternative electrical system according to this invention.

Although thus far the system has been shown with a single element for the first electrical connection means, a single set of outputs for the second electrical connection means, and a transformer for the intermediate circuit means, this is not a necessary limitation of the invention. As shown in FIG. 7, a number of different style input connectors 210, 212, 214 may be selectively connected to a particular intermediate circuit means, for example battery charger 216, auxiliary battery 218, which may be the vehicle battery or may be a battery within the housing, or transformer means 110, 112, 114. Switch means 220 may selectively connect any one or more of the connectors 210, 212, 214, with battery charger 216, auxiliary battery 218, or transformer means 220. Similarly at the output, switching means 222 may connect the output of these devices to any one of the second set of connectors 224, 226, 228, which may also be of different styles, in order to prevent accidental interconnection of an input or output with the wrong device.

Figure 8:
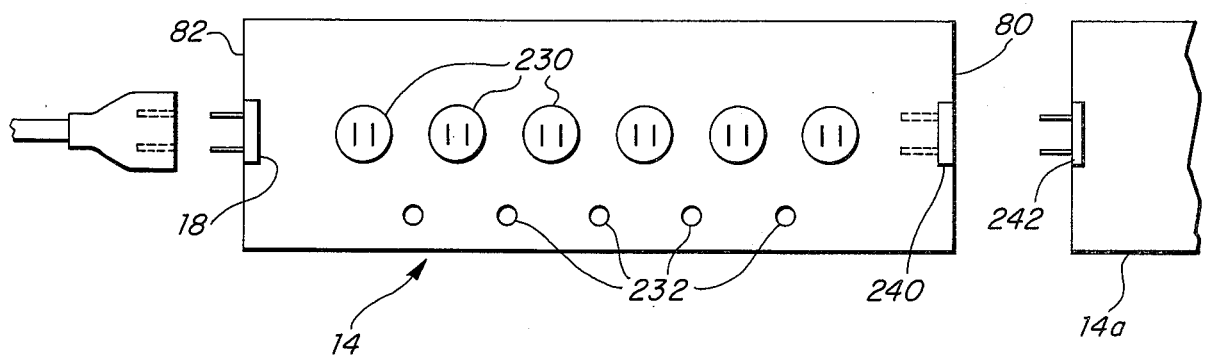
FIG. 8 is a schematic block diagram showing a modular form of housing according to this invention.

In addition to pigtail connectors 20, auxiliary distributor sockets 230, FIG. 8, and/or auxiliary distribution jacks 232 may be mounted on housing 14 as required to service various equipment. Housing 14 may also be made modular by providing on end plate 80 a female receptacle 240, which may receive a male receptacle 242 mounted in a second similar housing 14a, whereby input power from receptacle 18 may be transferred through receptacles 240 and 242 into second power service mounting system 14a.

Other embodiments will occur to those skilled in the art and are within the following claims:

What is claimed is:

1. A power service mounting system comprising:
   a plurality of wall mounting brackets, each having upper and lower spaced gripping means;
   a power service housing having upper and lower engaging portions on one side for engagement with said gripping means to hold said housing on a wall and second upper and lower engaging portions on the opposite side, said housing including first electrical connection means for connection with an external power source, second electrical connection means for distributing power, and intermediate circuit means interconnecting said first and second electrical connection means; and
   at least one equipment mounting bracket having upper and lower spaced gripping means for engagement with said second upper and lower engaging portions of said housing, one of said upper and lower spaced gripping means of said equipment mounting bracket including clamping means for urging said housing against the other of said upper and lower gripping means, and equipment mounting means for supporting equipment to be serviced by said system.

2. The power service mounting system of claim 1 in which said upper and lower gripping means of said wall mounting brackets include salient portions extending inwardly toward said housing and said first upper and lower engaging portions include grooves along the housing.

3. The power service mounting system of claim 1 in which at least one of said upper and lower gripping means of said equipment mounting bracket includes a salient portion extending toward said housing, said clamping means includes cam means, and said second upper and lower engaging portions include grooves along the housing.

4. The power service mounting system of claim 1 in which said housing includes a base and a cover and means along the edge of each for engaging the other.

5. The power service mounting system of claim 1 in which said housing includes a base having a rail along each edge and a cover having an internal channel along each lower edge that engage with said rails.

6. The power service mounting system of claim 1 in which said housing includes an end plate at each end and said first electrical connection means is mounted in one of said end plates.

7. The power service mounting system of claim 1 in which said intermediate circuit includes transformer means.

8. The power service mounting system of claim 1 in which said intermediate circuit includes battery charging means.

* * * * *